United States Patent
Stahl et al.

(10) Patent No.: US 11,848,725 B2
(45) Date of Patent: Dec. 19, 2023

(54) NEAR FIELD COMMUNICATION-BASED METHOD AND SYSTEM FOR STATE OR EVENT DETECTION OR CLASSIFICATION

(71) Applicant: NXP B.V., Eindhoven (NL)

(72) Inventors: Johannes Stahl, Graz (AT); Markus Wobak, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/691,619

(22) Filed: Mar. 10, 2022

(65) Prior Publication Data
US 2023/0291437 A1    Sep. 14, 2023

(51) Int. Cl.
*H04B 5/00*      (2006.01)
*G06K 7/10*      (2006.01)
*G06K 19/07*     (2006.01)

(52) U.S. Cl.
CPC ....... *H04B 5/0031* (2013.01); *G06K 7/10336* (2013.01); *H04B 5/0056* (2013.01); *G06K 19/0726* (2013.01)

(58) Field of Classification Search
CPC ............... H04B 5/0031; H04B 5/0056; G06K 7/10336; G06K 19/0726
USPC ..................................................... 455/41.1
See application file for complete search history.

(56) References Cited

U.S. PATENT DOCUMENTS

| | | | |
|---|---|---|---|
| 3,769,575 A | 10/1973 | Rist et al. | |
| 4,023,167 A | 5/1977 | Wahlstrom | |
| 4,321,539 A | 3/1982 | Trump | |
| 6,476,708 B1 | 11/2002 | Johnson | |
| 8,547,911 B2 | 10/2013 | Bertorelle | |
| 9,124,302 B2 | 9/2015 | Krishnan et al. | |
| 9,171,440 B2 | 10/2015 | Frederick | |
| 9,306,626 B2 | 4/2016 | Hall et al. | |
| 9,524,383 B2 | 12/2016 | Davis | |
| 9,819,401 B2 | 11/2017 | Karandikar et al. | |
| 10,511,347 B2 | 12/2019 | Huebner et al. | |

(Continued)

FOREIGN PATENT DOCUMENTS

| | | |
|---|---|---|
| EP | 1148437 A2 | 10/2001 |
| EP | 2107495 A2 | 10/2009 |

(Continued)

OTHER PUBLICATIONS

"EMV Contactless Specifications for Payment Systems; Book D; EMV Contactless Communication Protocol Specification"; Version 2.6; Mar. 2016.

(Continued)

*Primary Examiner* — Eugene Yun

(57) ABSTRACT

Near field communication (NFC) methods, systems, and devices are disclosed herein. In an example embodiment, the method includes providing a first NFC device including a NFC antenna, and transmitting a radio frequency (RF) signal including a RF carrier signal by way of the NFC antenna. Also, the method includes receiving a first resonant signal after the transmitting has ceased, and processing the first resonant signal to generate a first portion of transformed signal information. Further, the method includes identifying one or both of a first state and a first event based at least in part upon or associated with the first portion of the transformed signal information.

13 Claims, 6 Drawing Sheets

(56) References Cited

U.S. PATENT DOCUMENTS

| | | | |
|---|---|---|---|
| 10,945,210 | B2 | 3/2021 | Wobak et al. |
| 11,037,435 | B2 | 6/2021 | Wobak et al. |
| 2010/0259390 | A1 | 10/2010 | Borcherding |
| 2013/0225071 | A1 | 8/2013 | Royston et al. |
| 2016/0322853 | A1 | 11/2016 | Porat et al. |
| 2017/0126267 | A1* | 5/2017 | Park .................... H04B 1/3888 |

FOREIGN PATENT DOCUMENTS

| | | |
|---|---|---|
| EP | 3173968 A1 | 5/2017 |
| WO | 2012/002879 A1 | 1/2012 |

OTHER PUBLICATIONS

ISO/IEC 14443-1 "Cards and Security Devices for Personal Identification—Contactless Proximity Objects—Part 1: Physical Characteristics"; Fourth Edition; Apr. 2018.
ISO/IEC 14443-2 "Cards and Security Devices for Personal Identification—Contactless Proximity Objects—Part 2: Radio Frequency Power and Signal Interface"; Fourth Edition; Jul. 2020.
ISO/IEC 14443-3 "Cards and Security Devices for Personal Identification—Contactless Proximity Objects—Part 3: Initialization and Anticollision"; Fourth Edition; Jul. 2018.
ISO/IEC 14443-4 "Cards and Security Devices for Personal Identification—Contactless Proximity Objects—Part 4: Transmission Protocol"; Fourth Edition; Jul. 2018.
ISO/IEC 15693-1 "Cards and Security Devices for Personal Identification—Contactless Vicinity Objects—Part 1: Physical Characteristics"; Third Edition; Jul. 2018.
ISO/IEC 15693-2 "Cards and Security Devices for Personal Identification—Contactless Vicinity Objects—Part 2: Air Interface and Initialization"; Third Edition; Apr. 2019.
ISO/IEC 15693-3 "Cards and Security Devices for Personal Identification—Contactless Vicinity Objects—Part 3: Anticollision and Transmission Protocol"; Third Edition; Apr. 2019.
NFC Forum; "Analog Technical Specification"; Version 2.2; Jul. 29, 2021.
NFC Forum; "Digital Protocol Technical Specification"; Version 2.3; Aug. 3, 2021.
Chen, Szi-Wen et al.; "A two-Stage Discrimination of Cardiac Arrhythmias Using a Total Least Squares-Based Prony Modeling Algorithm"; IEEE Transactions on Biomedical Engineering, Oct. 2000; DOI: DOI: 10.1109/10.871404.
Hua, Yingbo et al.; "Matrix Pencil Method for Estimating Parameters of Exponentially Damped/Undamped Sinusoids in Noise"; IEEE Transactions on Acoustics, Speech, and Signal Processing, May 1990; DOI: 10.1109/29.56027.
Markovsky, Ivan et al.; "Overview of Total Least-Squares Methods"; Signal Processing, vol. 87, Issue 10; Oct. 2007; DOI: https://doi.org/10.1016/j.sigpro.2007.04.004.
Rodriguez, A. Fernandez, et al.; "Coding Prony's Method in MATLAB and Applying it to Biomedical Signal Filtering"; BMC Bioinformatics; Nov. 26, 2018; DOI: 10.1186/s12859-018-2473-y.
ISO/IEC FCD 14443-3, Final Committee Draft; "Identification cards—Contactless integrated circuit(s) cards—Proximity cards—Part 3: Initialization and anticollision"; Jun. 11, 1999.
Stahl et. al., "Classification of Objects in the Proximity of an NFC Reader Device" U.S. Appl. No. 17/448,367, filed Sep. 22, 2021.
Wobak et al., "Communication Device and Method of Operating a Communication Device" U.S. Appl. No. 17/647,285, filed Jan. 6, 2022.

* cited by examiner

NEAR FIELD COMMUNICATION-BASED METHOD AND SYSTEM FOR STATE OR EVENT DETECTION OR CLASSIFICATION

CROSS-REFERENCE TO RELATED APPLICATIONS

Statement Regarding Federally Sponsored Research or Development

FIELD OF THE DISCLOSURE

The present disclosure relates to wireless communications systems and methods and, more particularly, to near field communication (NFC) systems and methods.

BACKGROUND OF THE DISCLOSURE

Radio Frequency Identification (RFID) or Near Field Communication (NFC) systems often include a primary NFC device (also referred to as a card reader or simply a reader) and one or more secondary NFC devices (also referred to as cards or active devices in card emulation mode). The reader operates to generate a 13.56 MHz RF (radio frequency) carrier signal to power cards in its proximity. The devices form a magnetically coupled RF network of which each device has its RF resonance frequency that is in-band, at or close to the carrier frequency. Additionally, RF communication methods employing modulation with respect to any of amplitude, frequency, or phase domains may be applied to achieve time interleaved communications between the primary and secondary devices. Such operation may be defined by RF standards such as ISO/IEC14443, ISO/IEC15693, EMVCo Contactless, or NFC Forum.

NFC systems are presently implemented in a wide variety of applications. Typical NFC application examples include contactless payment, transit, access, ticketing and gaming. For proper operation in some such use cases, only one card should be present in the vicinity of the reader. Satisfaction of this requirement may be important for avoiding ambiguities in terms of which card should be interacting with a reader at any given moment. For example, if only one contactless credit card is present in the vicinity of a reader, then this will avoid ambiguities that might otherwise occur if more than one such card was present in the vicinity of the reader, such as ambiguities regarding which contactless credit card should be charged. However, with respect to some other conventional applications/use cases, for example, with respect to the use of readers and cards in warehouses or for logistics, a multiplicity of NFC cards may be present.

A conventional NFC system often includes multiple magnetically coupled resonant circuits. The current state of a given coupled circuit as seen by a reader (or primary NFC device) may be defined by various factors, including each individual device's self-resonance frequency and the magnetic coupling coefficients between the reader and one or more other devices or counterparts (e.g., one or more cards or secondary NFC devices). However, although the reader of a conventional NFC system typically receives logical data in-band information as sent by its counterparts, typically a conventional reader is not aware of what counterparts are present in its proximity. Consequently, in applications where it may be important for only a single card to be present in the vicinity of the reader, it may be impossible for the reader to determine that this requirement is being met.

Further, although there are applications where it may be appropriate to adjust the operation of the reader or the overall NFC system based upon what counterparts or other devices are in proximity to the reader, a conventional NFC system may lack sufficient information about the various devices that are coupled with one another and part of the NFC system in order to make such adjustments.

For at least one or more of these reasons, or one or more other reasons, it would be advantageous if new or improved NFC systems or NFC devices could be developed, and/or new or improved methods of operation or implementation of such systems or devices could be developed, so as to address any one or more of the concerns discussed above or to address one or more other concerns or provide one or more benefits.

DETAILED DESCRIPTION

Figure 1:
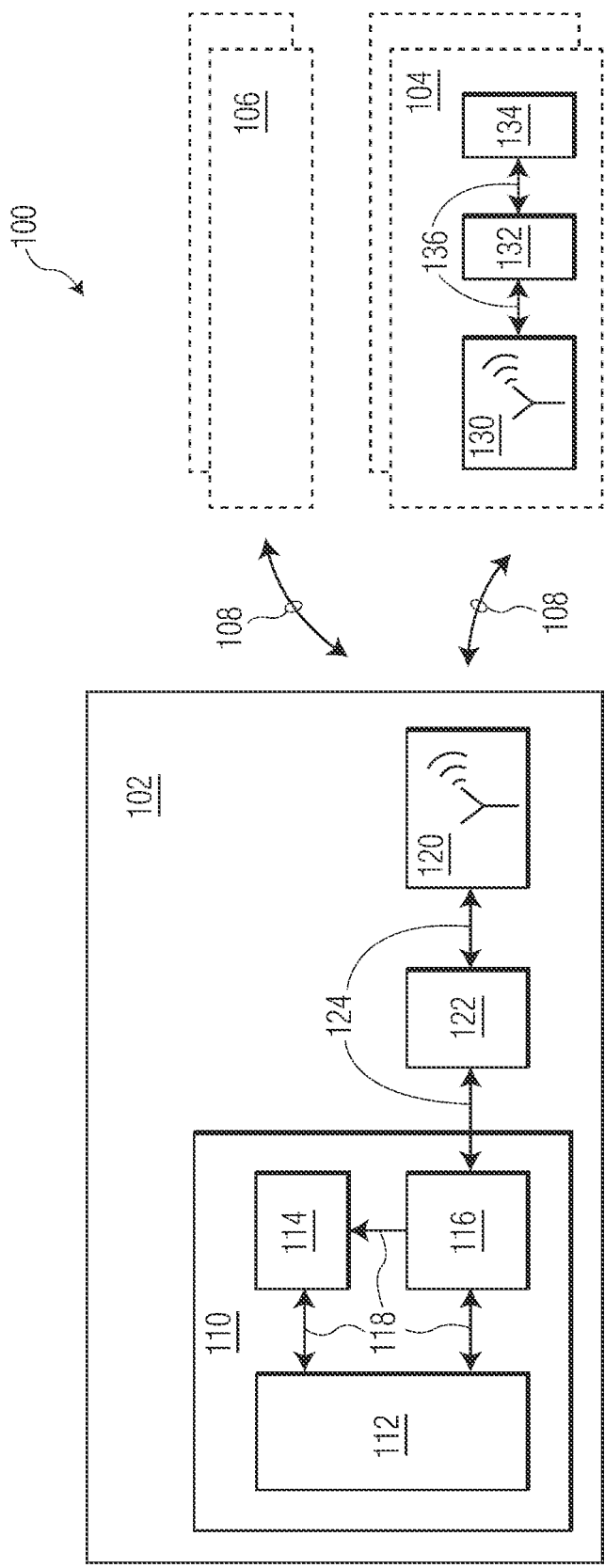
FIG. 1 is a schematic diagram illustrating an example NFC system having a primary NFC device in communication with a plurality of secondary devices that include a NFC counterpart device and a non-NFC counterpart device and configured for operation in accordance with an example method disclosed herein.

The present inventors have recognized that Near Field Communication (NFC) systems rely on physical (e.g., magnetic, or inductive wireless) coupling effects for energy transfer and communication, and that these physical coupling effects may be sensed, interpreted, and exploited to achieve enhanced operation of such NFC systems and/or associated devices. More particularly, the present inventors have recognized that these physical coupling effects form (or may be controlled or influenced so as to form) specific patterns by a proper design of the coupling system. Further, the present inventors have recognized that, by "decoding" one or more of these patterns, it is possible to derive useful (and possibly unique) insights regarding the actual environment with respect to which a given NFC system is exposed (or in which the system is operating), and/or insights regarding the physical arrangements of one or more NFC devices relative to one another and/or other structures. By virtue of obtaining these insights, the NFC system (or a NFC device thereof) is effectively able to "draw" a picture of, or model, the environment. Such modeling of the environment enables the NFC system (or a NFC device thereof) to perform functions such as state detection, event classification, and/or other functions such as gesture, profile, or feature detection and connected actions associated therewith.

The present disclosure relates, in at least some embodiments, to NFC systems in which a NFC device is configured to sense its environment with measurement pulses (which are compliant with NFC regulations), and to translate the measurements into states and/or events, with a given event being defined as or associated with a sequence or series of one or more states (typically more than one state). By virtue of such operation, an additional user-control interface is established, as the identification of states and/or events may be used to control applications on, and/or functionalities of or actions taken by, the NFC device (e.g., a host device) and/or possibly other systems or devices with respect to which that NFC device is in communication.

Also, the present disclosure in at least some embodiments relates to a method of operation that includes exciting an NFC system (or NFC coupling system, or a NFC device of the NFC system) with a measurement RF pulse, and measuring the ringing signal (RF-off ringing) after the pulse. Such operation enables a NFC device of the NFC system to perform broadband system response analysis. The captured response or transformations thereof may be interpreted as a characteristic (e.g., physically non-cloneable) feature vector, which represents a certain state of the coupling system. More particularly, the broadband information allows for determinations to be made regarding the current system coupling state, for example, by providing information about what other device(s) (e.g., NFC counterpart device(s)) are present and specifics about how those other device(s) are positioned relative to (e.g., on) a primary NFC device. Further, NFC events may be identified by evaluating a sequence of measured feature vectors (e.g., the sequence of states). The identified NFC states/events may in turn be used to enable an additional user-interface for NFC devices. Thus, by broadband excitation of the NFC coupling system and subsequent broadband signal analysis, it is possible to determine characteristic (or unique) features, states, and events, and to perform actions that are associated with (or that are in response to) such determinations of those features, states, and events.

The present disclosure additionally relates to numerous applications of such NFC systems, devices, and methods. For example, such applications or use cases may involve general environment sensing, gaming, and NFC physical access. For example, at least some embodiments encompassed herein allow for a NFC primary device (e.g., a reader) to detect the orientation condition of a card positioned on top of the reader. For applications such as gaming, such detection of the orientation condition of a card allows for intuitive user interaction based on a NFC link without the need for further sensors.

Referring to FIG. 1, an example near field communication (NFC) system 100 is shown in schematic form. The NFC system 100, which may be considered a basic coupled NFC system configured to perform feature extraction and processing, in this embodiment includes a primary NFC device (or primary NFC-enabled device) 102, a NFC counterpart device (or NFC-enabled counterpart device) 104, and a non-NFC counterpart device 106. The primary NFC device 102 is wirelessly coupled to each of the NFC counterpart device 104 and the non-NFC counterpart device 106 by way of radio frequency (RF) couplings 108. The RF couplings 108 may take various forms depending upon the embodiment and, in the present embodiment, represent wireless couplings or linkages (particularly inductive, magnetic couplings). The wireless couplings or linkages may be continuous, substantially continuous, or intermittent or occasional, depending upon the embodiment or circumstance. Each of the NFC counterpart device 104 and the non-NFC counterpart device 106 may be considered a respective secondary device.

Further as shown, the primary NFC device 102 includes a NFC subsystem 110 that has a control unit 112, a process and identification unit 114, and a RF modem 116. As represented by arrows 118, which are representative of internal communication links (such as a bus), the control unit 112 is in bidirectional communications with each of the process and identification unit 114 and the RF modem 116, and further the RF modem 116 may send signals to the process and identification unit 114. The primary NFC device 102 also includes a primary NFC antenna 120 and a RF matching circuit 122. As represented by additional arrows 124, which again are representative of internal communication links (such as a bus), the RF modem 116 of the NFC subsystem 110 is connected to the primary NFC antenna 120 via the RF matching circuit 122. The NFC antenna 120 and RF matching circuit 122 represent (or constitute) a resonant circuit network (or resonance circuit network).

The primary NFC device 102 is generally intended to be representative of any of a variety of different readers or other primary NFC devices. For example, the primary NFC device 102 may be any of a variety of commercial products available from NXP Semiconductors N.V. (of Eindhoven, Netherlands) that are configured for operation in (or operation in supporting) NFC reader mode, such as (but not limited to) NFC controllers for mobile devices as well as NFC frontend based devices.

Further, in the present example embodiment, the NFC counterpart device 104 is another NFC device, which includes an antenna 130, a matching circuit 132, and a NFC RF frontend circuit portion 134. More particularly, the matching circuit 132 is connected to each of the antenna 130 and the NFC RF frontend circuit portion 134 by way of internal communication links 136 (such as a bus), and the matching circuit, antenna, and NFC RF frontend circuit portion also represent (or constitute) a resonant circuit network (or resonance circuit network). In the present example, the primary NFC device 102 is an active device that generates RF signals and may be referred to as a reader. In contrast, the NFC counterpart device 104 is a passive device that may be referred to as a card. Alternatively, the NFC counterpart device 104 may be an active device operating in a card emulation mode. The primary NFC device 102 operating as a reader particularly may generate a 13.56 MHz RF carrier signal to power the NFC counterpart device 104 operating as a card when the NFC counterpart device 104 is positioned in proximity to the reader.

As for the non-NFC counterpart device 106, this device is intended to be representative of any of a variety of types of other counterpart devices that are not suited for NFC communications but that, at least in some circumstances, may interact with (be wirelessly coupled in some manner with) the primary NFC antenna 120 of the primary NFC device 102. Further for example, the non-NFC counterpart device 106 may be a non-NFC radio or a metal object that may influence the resonance behavior over frequency (as may be observed by the RF modem 116).

Although FIG. 1 particularly shows the NFC system 100 as including the primary NFC device 102, the NFC counterpart device 104, and the non-NFC counterpart device 106, the present disclosure is intended to encompass numerous other embodiments or operational circumstances in which the NFC system includes any other number of one or more of these types of devices. The primary NFC antenna 120 of the primary NFC device 102 may be magnetically coupled with a multiplicity of counterpart devices of one or more types, but there may be also a single counterpart device present or no counterpart devices present. For example, in another example embodiment, the NFC system 100 will only include the primary NFC device 102 in combination with one or more than one of the NFC counterpart devices 104, but not include any non-NFC counterpart device such as the non-NFC counterpart device 106. Also for example, in another operational circumstance, the NFC system 100 will only include the primary NFC device 102.

The present disclosure also envisions embodiments and arrangements, and operational circumstances, in which there are present more than one active device (e.g., more than one of the primary NFC devices 102) that are in communication with one another, alone or in combination with one or more of the NFC counterpart devices and/or with one or more of the non-NFC counterpart devices. For example, in some such embodiments, there are multiple active devices that communicate with one another in a peer-to-peer manner.

The presence (or absence) and/or positioning of one or more (or many) counterpart devices, relative to a given primary NFC device such as the primary NFC device 102, may be referred to as system state. Several examples of various system states that may occur depending upon the embodiment or circumstance include: (1) a first system state in which no counterpart device (NFC counterpart device or non-NFC counterpart device) is present; (2) a second system state in which only a specific NFC counterpart device is present in proximity to the primary NFC device (or reader) 102; (3) a third system state in which a NFC counterpart device such as the NFC counterpart device 104 has a specific positioning (e.g., relative to the primary NFC device); or (4) a fourth system state in which there is an instantaneous coupled resonance frequency (e.g., as determined at the primary NFC device 102) of a coupled NFC counterpart device such the NFC counterpart device 104.

Notwithstanding the aforementioned examples of system states, the present disclosure is also intended to encompass embodiments and arrangements, and operational circumstances, in which any of a variety of other system states may occur or arise in addition to, or instead of, the aforementioned examples. The system states that may occur may depend upon, among other things, which and how many of the counterpart devices are present as part of the system, and more particularly, which and how many of the counterpart devices are proximate to the primary NFC device 102.

Figure 2:
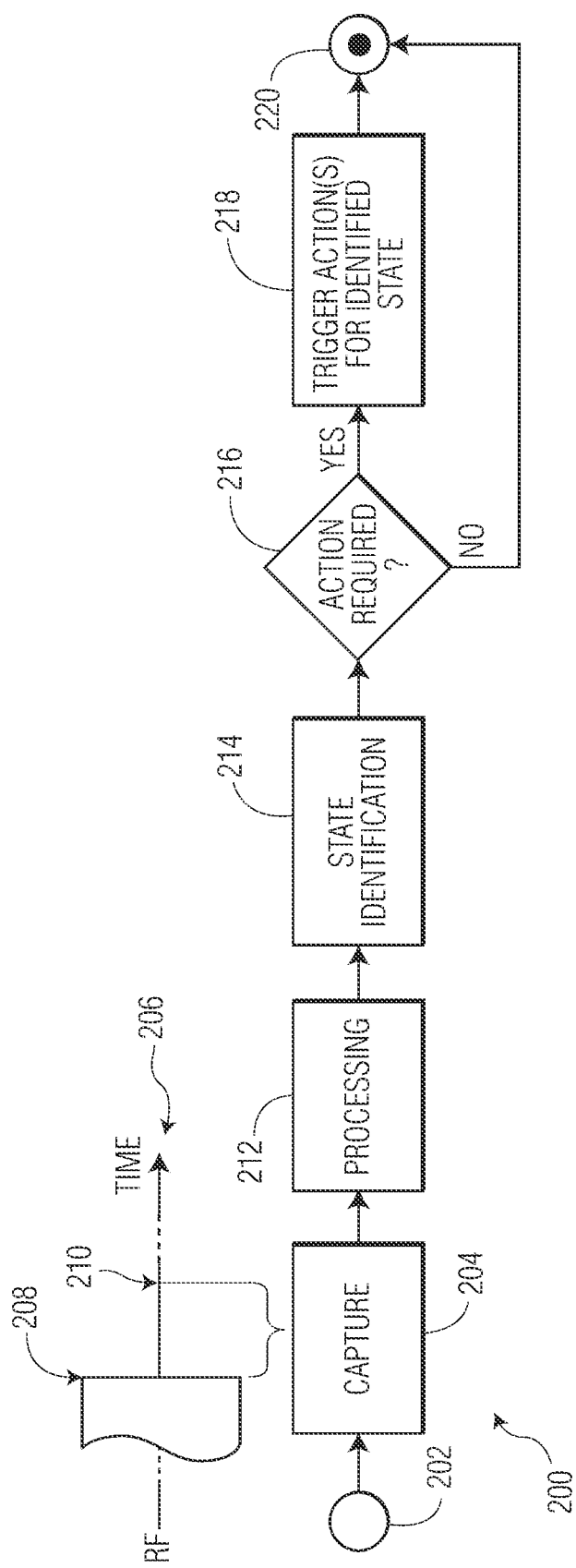
FIG. 2 is a flow chart illustrating a method of operation of the NFC system of FIG. 1, and particularly the primary NFC device thereof, in accordance with an example embodiment encompassed herein.

Turning to FIG. 2, a flow chart 200 is provided to illustrate a method (or time sequence) of operation of the NFC system 100 of FIG. 1, and particularly the primary NFC device 102 thereof. The method represented by the flow chart 200 particularly envisions that the primary NFC device 102 is configured in field generation mode, e.g., reader mode. As shown, the method begins at a start step 202 during which the primary NFC device is generating and transmitting an RF carrier signal. However, next at a capture step 204, the primary NFC device 102 disables transmission of the RF carrier signal (as generated by the RF modem 116). As illustrated by a timing graph 206 associated with the capture step 204, the transmission of the RF carrier signal ends at a first time 208, which may be referred to as a "FieldOff time."

Even though the transmitting of the RF carrier signal is disabled, there is still energy stored in the coupled resonant circuit of the primary NFC device 102 (e.g., as formed by the NFC antenna 120 and the RF matching circuit 122). The presence of the energy in the coupled resonant circuit exists at least for a short period of time after the first time 208 (the FieldOff time), for example, up until a second time 210. During the period of time when energy is present in the coupled resonant circuit subsequent to the first time 208 (after disabling of the transmitter), between that first time and the second time 210, the RF modem 116 may sense a decay signal (also referred to as RF-off ringing) and capture an energy discharge curve associated with that decay signal, so as to allow a broadband signal analysis. This may be done by monitoring the signal, for example, by sampling the signal by way of an analog-to-digital converter (ADC) as is typically present in the receiver stages of the NFC controller (e.g., within the NFC subsystem 110, such as within the control unit 112 of FIG. 1). Thus, as represented by the capture step 204 of FIG. 2, the primary NFC device 102 operates to capture, for example by way of ADC-executed sampling, information regarding the resonant signal existing within the resonant circuit between the first time 208 and second time 210. Additionally it should be noted that this sampling sequence does not conflict with any legacy NFC communication sequences.

Further with respect to the sampling that may be performed during the capture step 204 after the first time 208 (e.g., the FieldOff sampling performed after the FieldOff time), it should be appreciated that such sampling may be performed in any of a variety of manners (or occur in any of a variety of scenarios) depending upon the embodiment or circumstance. For example, the sampling may occur or begin at the end of a RF transaction (e.g., where the end occurs at the first time 208). Also for example, the sampling may occur in the context of, or after, a short RF sense pulse, as may be provided for low power card detection (LPCD). Further for example, the sampling may occur during RF communication using 100% amplitude shift key (ASK100) modulation, which is based on disabling the RF carrier for communication purposes.

Next, at a processing step 212, the primary NFC device 102 operates to process the data that was captured (sampled) at the capture step 204. As will be described in further detail below, the processing that is performed at the processing step 212 may take any of a variety of forms depending upon the embodiment. Subsequently, at a state identification step 214, the primary NFC device 102 further proceeds to identify the current system state. In the present example embodiment, the processing that occurs at the step 212 and the state identification that occurs at the step 214 are both performed by the process and identification unit 114 of the primary NFC device 102. Alternatively, such processing and/or state identification may be performed by way of one or more other processing devices alone or in combination with the process and identification unit 114 (e.g., by the combination of the control unit 112 and the process and identification unit 114).

Further, at a step 216, various actions may be triggered upon the identification or detection of a specific system state at the step 214. If at the step 216 the primary NFC device 102 determines that one or more actions are appropriate or required in view of the identified system state, the method advances to a step 218. At the step 218, the one or more actions that are appropriate or required are triggered and/or taken. Examples of system states that are identified, and actions that may be taken upon the identification of such system states, are described in further detail below. Also, although the step 218 of FIG. 2 is particularly directed toward the triggering of action(s) in response to the identification of a state, it should be appreciated (in view of additional description provided herein such as with respect to FIG. 4 and FIG. 6) that the step 218 may also, in a least some embodiments or circumstances, concern the triggering of action(s) in response to the identification of an event (or the identification of a state that completes an event). Additionally, upon the completion of the step 218, or alternatively if it is determined at the step 216 that no action(s) are appropriate or required in view of the system state(s) identified at the step 214, then the method of the flow chart 200 concludes at an end step 220. Further, although the method of FIG. 2 is shown to conclude with the end step 220, it should be recognized that the method may be performed repeatedly.

Figure 3:
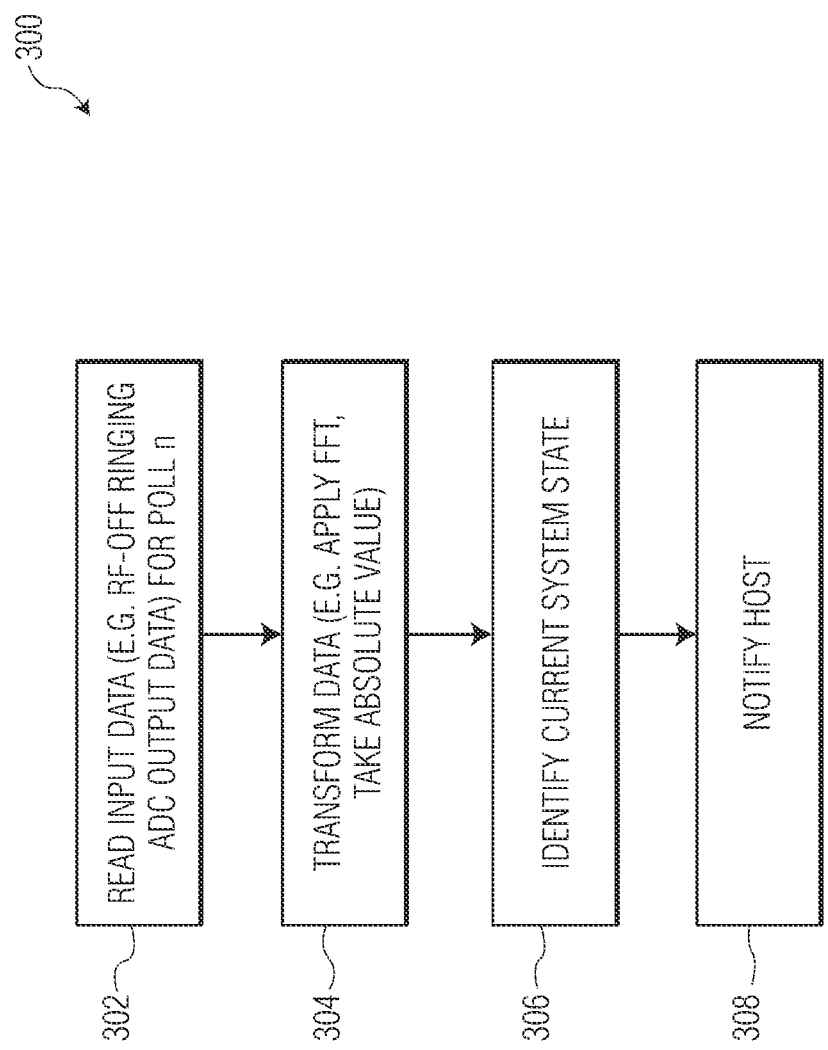
FIG. 3 is an additional flow chart illustrating an additional method of operation of the NFC system of FIG. 1, and particularly the primary NFC device thereof, in accordance with an additional example embodiment encompassed herein.

Turning to FIG. 3, an additional flow chart 300 illustrates an additional method of operation of the NFC system 100 of FIG. 1, and particularly the primary NFC device 102 thereof, in accordance with an additional example embodiment. In general, the method of FIG. 3 concerns example processing steps or operations (or blocks) of the primary NFC device 102 by which a current system state is identified. FIG. 3 may also be viewed as illustrating a possible implementation of a digital signal processing (DSP) chain to identify the current system state. The steps or operations particularly are ones that may be performed during and after the decay signal (or RF-off ringing) is sampled by the ADC. At this time, the process and identification unit 114 (or processing block) may extract information about the current environment, such that system states that are relevant to controlled application(s) may be identified and processed accordingly.

More particularly, the flow chart 300 begins with a first step 302, at which the primary NFC device 102 retrieves input data, for example, from reading ADC data during modulation or after the RF field has been switched off (e.g., at the time 208). The input data may be obtained by polling (e.g., poll n). This operation at the first step 302 may be considered to correspond to the capture step 204 of FIG. 2. Next, at a second step 304, the primary NFC device 102 performs one or more transformations of (or transforms) the data into a representation that allows for identification of the system state. The system state may be the state of the overall system, such as the NFC system 100, or a subsystem thereof (e.g., the primary NFC device 102). The particular transformation(s) that are performed at the second step 304 may vary depending upon the embodiment or circumstance. For example, in some embodiments, the transformation(s) performed at the second step 304 may include a discrete Fourier transform, nonlinear mappings such as dynamic range compression and rectifiers, or combinations thereof. The purpose or target of the transformation(s) performed at the second step 304 is to perform a pre-processing that optimizes the accuracy of the overall system state identification procedure for a given coupling system and application. This operation at the second step 304 may be considered to correspond to the processing step 212 of FIG. 2.

The output(s) of the data transformation performed at the second step 304 may be referred to as feature(s). Subsequent to the second step 304, at a third step 306 a classifier (of the primary NFC device 102) identifies the system state based upon the features that were determined at the second step. The particular classifier implementation(s) that are performed at the third step 306 may vary depending upon the embodiment or circumstance. For example, in some embodiments, the classifier implementation(s) performed at the third step 306 may include logistic regression-based models, neural networks, support vector machines, decision trees, or other machine learning or artificial intelligence software, programs, techniques, or algorithms. In some embodiments, the classifier(s) may be trained offline by presenting training examples for the system states that are relevant for the intended application. This operation at the third step 306 may be considered to correspond to the state identification step 214 of FIG. 2. Subsequently, at a fourth step 308, the primary NFC device 102 notifies a host (e.g., a host central processing unit (CPU) such as may be employed in a smart phone or other mobile device) about the current system state. This operation may be an example of an action triggered at the step 218 of FIG. 2. Also, although the method of FIG. 3 is shown to conclude with the fourth step 308, it should be recognized that the method may be performed repeatedly such that multiple system states are identified and multiple notifications of such states are provided.

Figure 4:
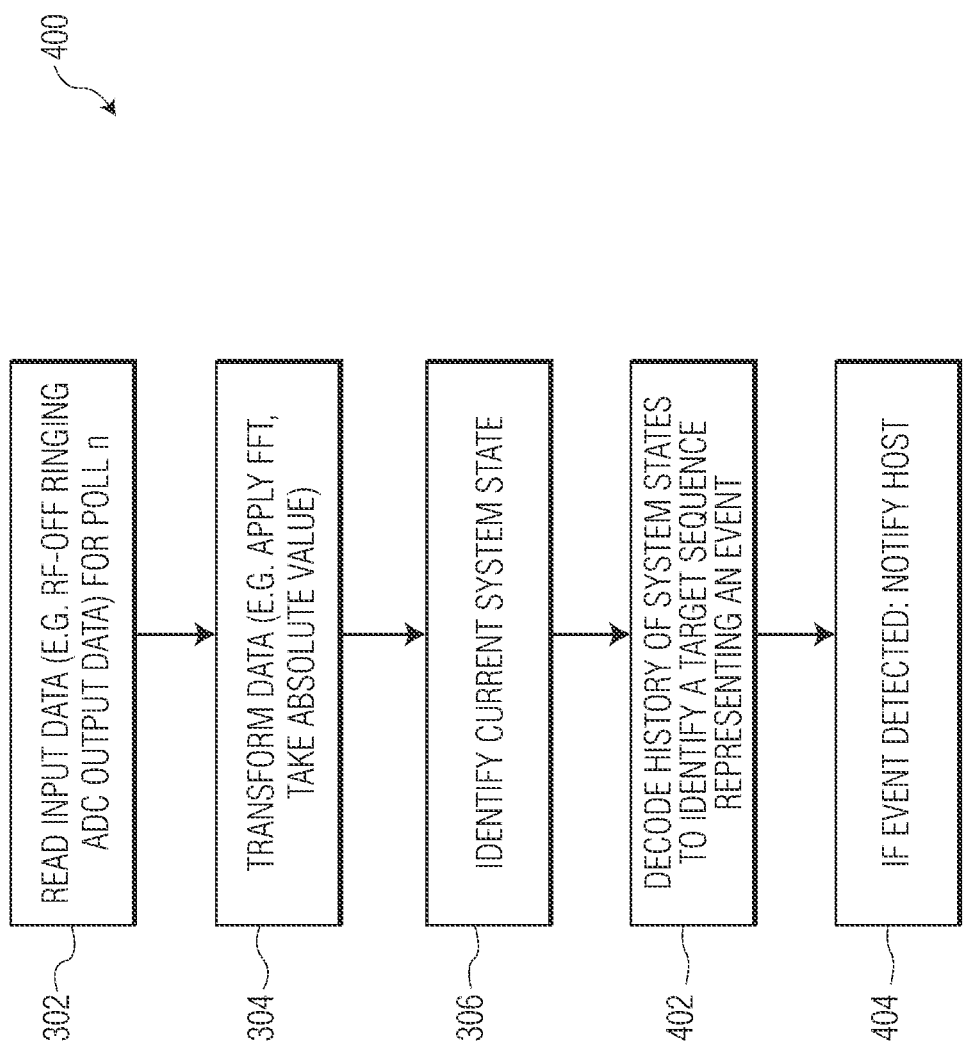
FIG. 4 is a further flow chart illustrating a further method of operation of the NFC system of FIG. 1, and particularly the primary NFC device thereof, in accordance with a further example embodiment encompassed herein.

Turning to FIG. 4, in at least some embodiments or circumstances, a sequence (or series) of system states may also be evaluated to enable the identification of one or more complex scenarios or events. In this regard, the term "event" may be understood as referring to a pre-determined sequence (or series) of one or more (typically more than one) system states that may be induced by any of a variety conditions, or occurrences. In at least some embodiments or circumstances herein, an event may particularly concern a sequence of systems states that may be induced by a user by intentionally influencing the coupling conditions of a NFC device and its environment. Upon the detection of an event, a functionality of or an application on the NFC device may be controlled according to the detected event, or in a manner corresponding to or appropriate in view of the detected event.

More particularly in this regard, FIG. 4 shows a further flow chart 400 that illustrates a further method of operation (or processing chain) of the NFC system 100 of FIG. 1, and particularly the primary NFC device 102 thereof, in which event detection is performed in accordance with a further example embodiment. That is, the further method of FIG. 3 concerns example processing steps or operations (or blocks) of the primary NFC device 102 by which an event is detected and identified. From a comparison of FIG. 4 with FIG. 3, it should be appreciated that the method illustrated by the further flow chart 400 again includes the first step 302, second step 304, and third step 306 of the method illustrated by the additional flow chart 300. That is, the first three steps of the method of FIG. 4 are identical (or at least substantially similar) to and serve the same purposes (or substantially the same purposes) as the first three steps of the method of FIG. 3.

However, in contrast to the flow chart 300 of FIG. 3, the flow chart 400 includes a fourth step (or block) 402 that differs from the fourth step 308. At the fourth step 402 in FIG. 4, the primary NFC device 102 analyzes the sequence of states that has occurred, and determines or identifies based upon that analysis whether a certain event or events has or have occurred (or not). More particularly, in at least one embodiment, the fourth step 408 may involve decoding a history of system states to identify a target sequence representing an event. In this regard, the fourth step 402 may take into account not merely a system state that was identified during the most recent performance of the third step 306, but rather additionally takes into account one or more previous system state(s) that was or were identified during earlier performances of the third step 306 (or that was or were identified in some other manner). Further, one example manner of performing or implementing the fourth step 402 may involve modeling state sequences by a hidden Markov model and decoding those state sequences by using the Viterbi algorithm.

Subsequently, at a fifth step 404, if an event has been detected, the primary NFC device 102 notifies a host (e.g., a host central processing unit (CPU) such as may be employed in a smart phone or other mobile device) regarding the detected event. Although the fifth step 404 particularly relates to such a notification action being taken, the present disclosure also encompasses other embodiments or arrangements in which one or more other types of actions is or are taken upon detection of a given event. Also, although the method of FIG. 4 is shown to conclude with the fifth step 404, it should be recognized that the method may be performed repeatedly such that multiple events are detected and multiple notifications of such events are provided.

Figure 5:
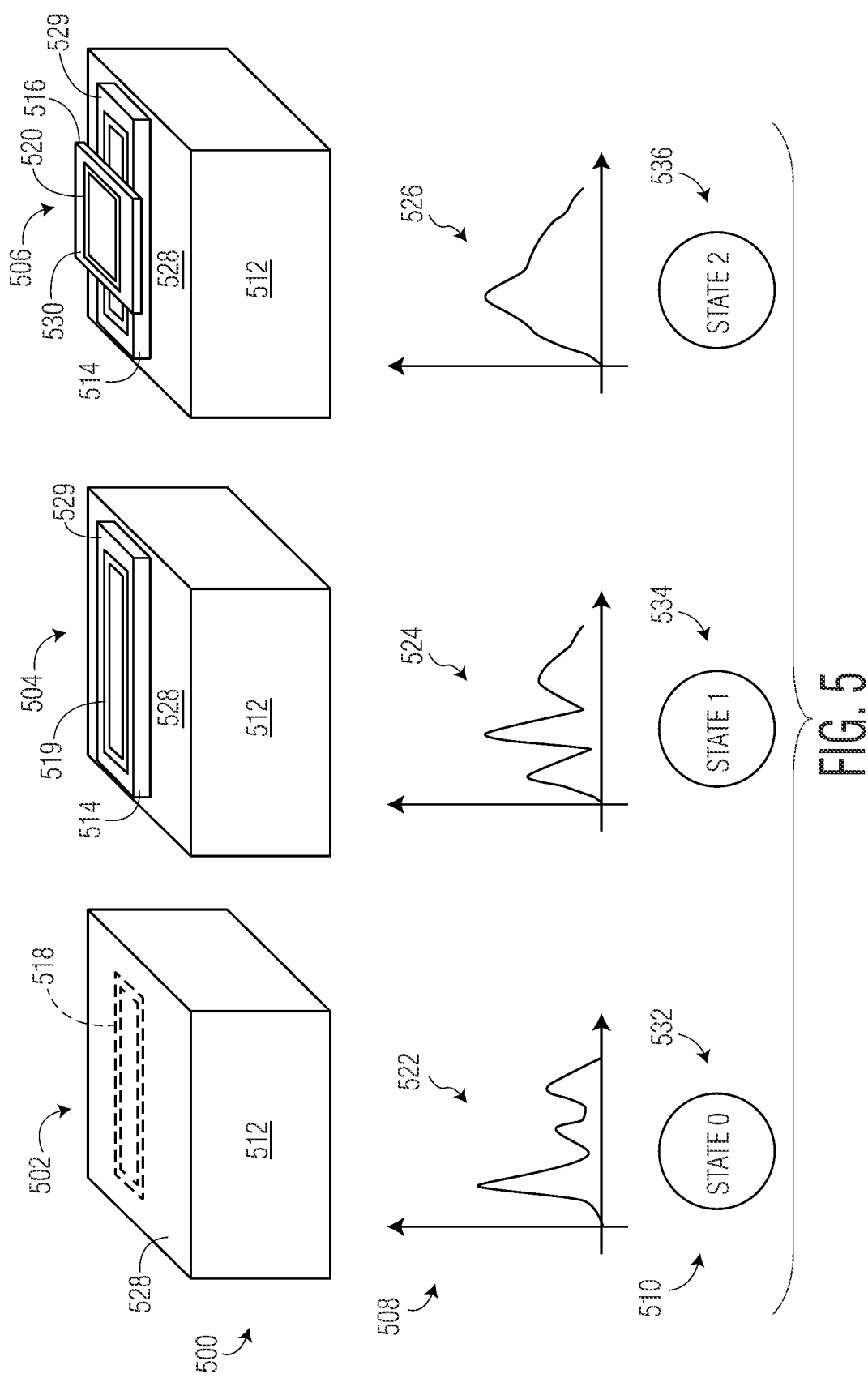
FIG. 5 is schematic diagram illustrating an example succession of first, second, and third states in which a primary NFC device is operating alone, operating in relation to a first NFC counterpart device, and operating in relation to both the first NFC counterpart device and a second NFC counterpart device, as well as example transformed representations of data obtained at the primary NFC device when operating in each of those states.
Figure 6:
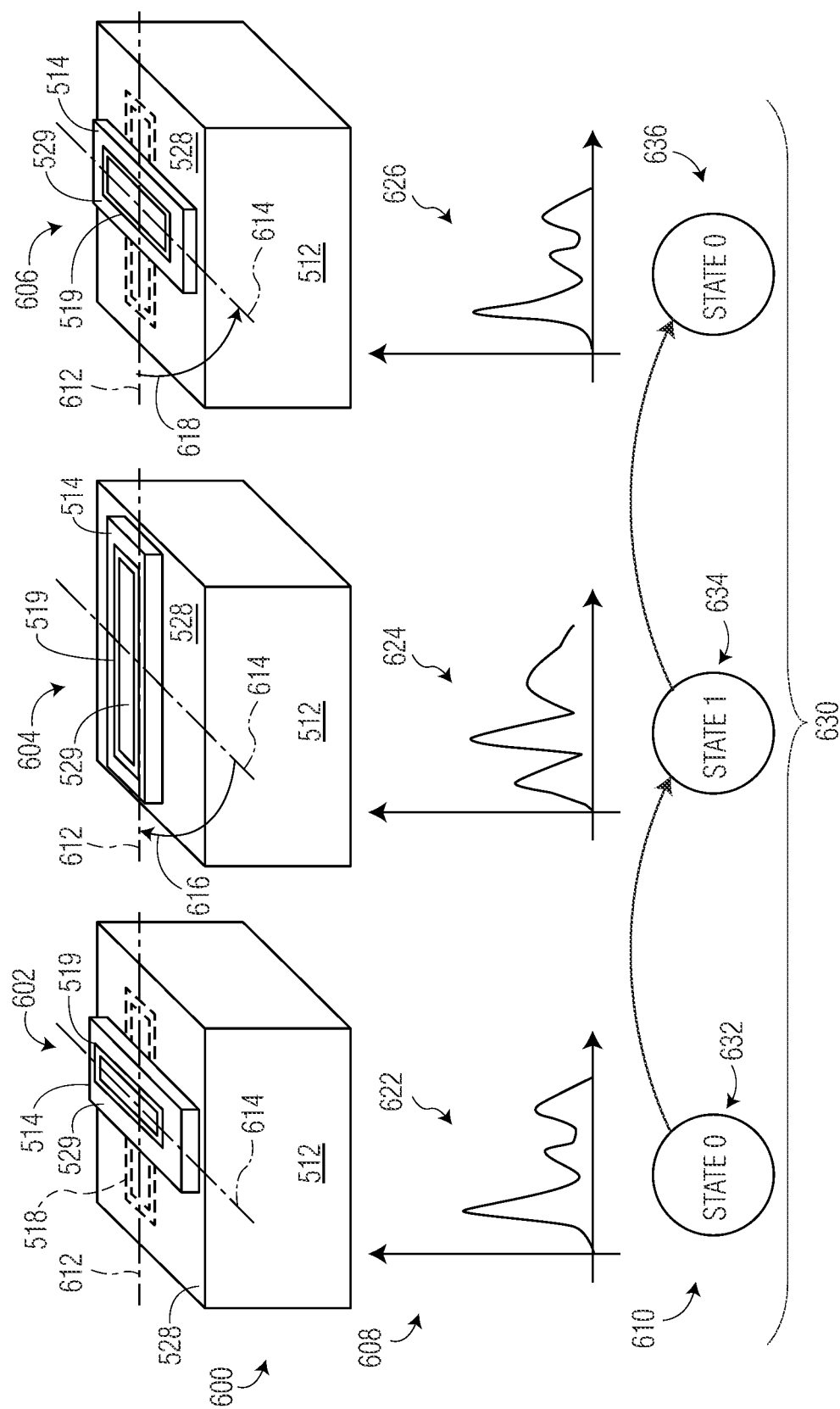
FIG. 6 is schematic diagram illustrating an example succession of first, second, and third states in which a primary NFC device is operating in relation to a NFC counterpart device having a first position relative to the primary NFC device, operating in relation to the NFC counterpart device having a second position relative to the primary NFC device, and again (on an additional occasion) operating in relation to the NFC counterpart device having the first position relative to the primary NFC device, as well as example transformed representations of data obtained at the primary NFC device when operating in each of those states.

The present disclosure is intended to encompass numerous different embodiments of systems that are configured to identify or detect, and/or to take one or more other actions in response to the identification/detection of (such as providing notifications regarding), any of a variety of different types of system states and/or events, in accordance with the methods of FIGS. 3 and 4 and/or similar methods. In this regard, FIG. 5 is provided to illustrate figuratively a first application example or use case in which the NFC system 100 of FIG. 1, and particularly the primary NFC device 102 thereof, operates in accordance with the method of FIG. 3 to identify three different example system states. Additionally, FIG. 6 is provided to illustrate figuratively a second application example or use case in which the NFC system 100 of FIG. 1, and particularly the primary NFC device 102 thereof, operates in accordance with the method of FIG. 4 to identify an event based upon a sequence of states. As described further below, each of the application examples/use cases illustrated by FIGS. 5 and 6 involve specific manipulations of a coupling environment of an NFC device, which represent (or correspond to) particular states/events.

More particularly, FIG. 5 illustrates an application example in which three NFC devices interact sequentially in three different manners so as to achieve three different coupling scenarios that correspond respectively to three different states. A first row 500 of FIG. 5 figuratively illustrates first, second, and third physical arrangements 502, 504, and 506, respectively, of three NFC devices, which are shown as first, second, and third NFC devices 512, 514, and 516, respectively. The respective first, second, and third physical arrangements 502, 504, and 506 of the NFC devices 512, 514, and 516 cause or constitute first, second, and third coupling scenarios. Additionally, a second row 508 of FIG. 5 shows first, second, and third feature space representations 522, 524, and 526, respectively, which respectively correspond to the first, second, and third physical arrangements 502, 504, and 506, respectively. Further, a third row 510 shows respective first, second, and third system states 532, 534, and 536, respectively, which are based upon and correspond to the first, second, and third feature space representations 522, 524, and 526, respectively. The first, second, and third system states 532, 534, and 536 are respectively indicative of the wireless coupling occurring in relation to or among one or more of the NFC devices 512, 514, and 516 when in the first, second, and third physical arrangements 502, 504, and 506, respectively.

In FIG. 5, the first NFC device 512 is a primary NFC device that may be identical, for example, to the primary NFC device 102. By comparison, each of the second NFC device 514 and third NFC device 516 is a respective NFC counterpart device. Each of the second and third NFC devices 514 and 516 may be, but need not be, identical to each other, and/or identical to the NFC counterpart device 104. The respective first, second, and third NFC devices 512, 514, and 516 are shown (by way of dashed or solid lines) to include first, second, and third antennas 518, 519, and 520, respectively. Additionally, as illustrated figuratively in the present example, the first NFC device 512 takes the form of a block or cube having several flat exterior surfaces including a top flat surface 528. Further, each of the second and third NFC devices 514 and 516 takes the form of a respective thin slab. The second NFC device 514 differs from the third NFC device 516 primarily in terms of the shapes of the primary (largest) side surfaces of each respective device. As shown in FIG. 5, the second NFC device 514 has primary (largest) side surfaces 529 that are generally rectangular such that each side surface includes two longer edges and two shorter edges, but the third NFC device 516 has primary (largest) flat surfaces 530 that are generally square.

As already noted, FIG. 5 illustrates three coupling scenarios corresponding to the first, second, and third physical arrangements 502, 504, and 506, respectively. In the example of FIG. 5, the first physical arrangement 502 is an arrangement in which the first NFC device 512 is alone and unloaded. By contrast, the second physical arrangement 504 is an arrangement in which the second NFC device 514 is positioned directly on top of the first NFC device 512, such that a first one of the primary side surfaces 529 of the second NFC device 514 is in contact with the top flat surface 528 of the primary NFC device 512. Also in the second physical arrangement 504, the respective antennas 518 and 519 of the first and second NFC devices 512 and 514 respectively are aligned with one another. The second physical arrangement 504 may be understood to be representative of a coupling scenario in which an expected environment exists for communications to occur by the primary NFC device 512 with the second NFC device 514.

Further, the third physical arrangement 506 is an arrangement in which, in addition to the first and second NFC devices 512 and 514 being arranged in the same manner as in the second physical arrangement 504, the third NFC device 516 is positioned directly on top of the second NFC device 514. More particularly, in the third physical arrangement 506, one of the primary side surfaces 530 of the third NFC device 516 is in contact with (directly on top of) a second one of the primary side surfaces 529 of the second NFC device 514, such that the second NFC device is sandwiched in between the first NFC device 512 and the third NFC device. The third physical arrangement 506 may be understood to be representative of a coupling scenario in which an unexpected environment exists for communications to occur by the first NFC device 512 with the second NFC device 514, because of the additional presence of the third NFC device 516 in the vicinity of the first NFC device 512.

It should be recognized that, in view of the above discussion concerning FIGS. 2, 3, and 4, the first NFC device 512 of FIG. 5 continuously evaluates the coupling environment by regularly performing measurement polls, for example, in a manner consistent with the first step 302 of FIG. 3 (or FIG. 4). These measurements are performed when the first NFC device 512 is present in each of the first, second, and third physical arrangements 502, 504, and 506 of the first row 500. Additionally, the first NFC device 512 also performs processing to evaluate the system response to a broadband excitation signal (e.g., a step response) in the frequency domain—namely, the amplitude of the discrete Fourier transform. This processing may be understood to occur in a manner consistent with the second step 304 of FIG. 3 (or FIG. 4). By virtue of this processing, the first NFC device 512 particularly generates data or results that, in the second row 508 of FIG. 5, take the form of the first, second, and third feature space representations 522, 524, and 526, respectively. It will particularly be appreciated that, in FIG. 5, each of the first, second, and third feature space representations 522, 524, and 526 is a respective graph of spectral amplitude (along the y-axis) versus frequency (along the x-axis) of the RF-off ringing system response signal, which is respectively determined for the first, second, and third physical arrangements 502, 504, and 506, respectively.

Further, the first NFC device 512 performs additional processing to evaluate the spectral characteristics shown in the first, second, and third feature space representations 522, 524, and 526, respectively, and to thereby determine the first, second, and third states (system states or algorithm states) 532, 534, and 536, respectively, which correspond to those respective feature space representations. This additional processing may be understood to occur in a manner consistent with the third step 306 of FIG. 3 (or FIG. 4). In the present example, this additional processing includes mapping by a classifier of the respective first, second, and third feature space representations 522, 524, and 526 to the respective states 532, 534, and 536 shown in the third row 510 of FIG. 5.

In the example embodiment of FIG. 5, the first state 532 (which may also be referred to as a "State 0") refers to the first physical arrangement 502 and corresponding first coupling scenario in which the first NFC device 512 experiences the unloaded condition. Additionally, the second state 534 (which may also be referred to as a "State 1") refers to the second physical arrangement 504 and corresponding second coupling scenario in which there is an expected (or normal) environment for communicating with the second NFC device 514 (by the first NFC device 512). The second state 534 ("State 1") may be considered a state in which communications between the first NFC device 512 and second NFC device 514 is initiated, or during which normal communications between those NFC devices occurs. Further, the third state 536 (which may also be referred to as a "State 2") refers to the third physical arrangement 506 and corresponding third coupling scenario in which the first NFC device 512 experiences the presence of the third NFC device 516 in the vicinity of the first NFC device 512 when the second NFC device 514 is also present. The third state 536 ("State 2") may be understood as representing an unexpected communication scenario, which may be handled separately from the scenario corresponding to the second state 534.

The third state 536 may arise in any of a variety of circumstances, depending upon the embodiment or characteristics or purposes of the NFC devices. For example, in one embodiment, the first NFC device 512 is a door access reader, and the second NFC device 514 is an access card. In such an embodiment, the first NFC device 512 may be configured to restrict NFC communications to circumstances in which the system (and particularly the first NFC device) is in the second state 534 ("State 1"). That is, in such an embodiment, a NFC cycle of communications will be initiated by the first NFC device 512 with the second NFC device 514 only if the first NFC device is experiencing an expected (or normal) communications environment in accordance with the second state 534 ("State 1"). Further, the first NFC device 512 may also be configured so that no NFC communication will be performed if the third state 536 ("State 2") is reached. This is appropriate because, when the system (and particularly the first NFC device 512) is in the third state 536, not only the required access card is present but also an additional (unexpected) NFC device is present and coupled to the first NFC device. Thus, if the first NFC device 512 is configured in this manner, the first NFC device (and this associated method of operation) is capable of detecting the presence of RF spying devices (e.g., the third NFC device 516) potentially used by intruders to intercept or capture ongoing NFC RF communications between the first NFC device and the second NFC device 514.

It should be appreciated that, in at least some embodiments, the manner of processing performed by the first NFC device 512 during the second step 304 and/or during the third step 306 may be determined based upon training of that first NFC device (or of the overall system). For example, to determine whether the second state 534 ("State 1") has occurred, and correspondingly whether the system (and particularly the first NFC device 512) is experiencing an expected (or normal) coupling scenario, the system (and particularly the first NFC device 512) may operate based upon software or programming that is developed by way of training. In some embodiments or circumstances, the software or programming may include artificial intelligence or machine learning, and such training may involve training neural networks to allow the first NFC device to learn "expected communication scenarios" and to differentiate between such scenarios and other communication scenarios. Further, for such embodiments, the methods shown in FIG. 3 and FIG. 4 may also include a separate training step or phase (e.g., preceding the first step 302 in each case), in which the first NFC device 512 has an opportunity to learn "expected communication scenarios" (such a training step, or data for such a training step, may be provided to users to allow for the training of the first NFC device).

Turning to FIG. 6, an additional application example is illustrated that again involves the first and second NFC devices 512 and 514 (as described above in regard to FIG. 5). As with FIG. 5, FIG. 6 illustrates example relationships (or links) between device-to-device orientations and their representations in terms of features and system states (or algorithm states). In the example of FIG. 6, the first and second NFC devices 512 and 514 particularly interact in a succession of manners in which the second NFC device 514 is rotated relative to the first NFC device 512 from a first position to a second position and back again, as may occur in the context of a gesture (e.g., a gesture provided by a user's rotation of the second NFC device 514). More particularly as shown, a first row 600 of FIG. 6 figuratively illustrates a succession (or sequence or series) of first, second, and third physical arrangements 602, 604, and 606 that again involve the first and second NFC devices 512 and 514. Further, each of the first, second, and third physical arrangements 602, 604, and 606 respectively is an arrangement in which the second NFC device 514 is positioned directly on top of the first NFC device 512, such that a first one of the primary side surfaces 529 of the second NFC device 514 is in contact with the top flat surface 528 of the first NFC device 512.

It will be appreciated from a comparison of FIG. 6 with FIG. 5 that the second physical arrangement 604 of the first row 600 of FIG. 6 is identical to the second physical arrangement 504 of the first row 500 of FIG. 5, in terms of the relative positioning of the first and second NFC devices 512 and 514, respectively. That is, as with the second physical arrangement 504 of FIG. 5, in the second physical arrangement 604, the second NFC device 514 is positioned relative to the first NFC device 512 such that the respective antennas 518 and 519 of the first and second NFC devices 512 and 514 respectively are aligned with one another. In particular, respective long axes of each of the antennas 518 and 519 extend in a manner that is parallel with a first axis 612 extending along the top flat surface 528 of the first NFC device 512.

By contrast, in each of the first and third physical arrangements 602 and 606, the second NFC device 514 is positioned relative to the first NFC device 512 such that the respective antennas 518 and 519 respectively are perpendicular with one another. That is, although the respective long axis of the antenna 518 of the first NFC device 512 continues to extend parallel to the first axis 612 in each of the first and third physical arrangements 602 and 606, the respective long axis of the antenna 519 of the second NFC device 514 extends parallel to a second axis 614 extending along the top flat surface 528 of the first NFC device 512, where the second axis 614 is perpendicular to the first axis 612. It should be recognized that, although the first and third physical arrangements 602 and 606 are described as distinct physical arrangements insofar as the two arrangements occur at different times during the succession of arrangements that occur in the first row 600, in actuality the physical positions of the second NFC device 514 relative to the first NFC device 512 in both of the first and third physical arrangements 602 and 606 are identical in this example.

FIG. 6 additionally illustrates the manners in which the second NFC device 514 moves relative to the first NFC device 512 as the succession of physical arrangements represented in the first row 500 takes place. More particularly, as represented by a first arrow 616, the succession of physical arrangements of the first row 500 proceeds from the first physical arrangement 602 to the second physical arrangement 604 when the second NFC device 514 is rotated 90 degrees clockwise (as illustrated in FIG. 6) along the top flat surface 528 of the first NFC device 512. As a consequence of this rotation, the long axis of the antenna 519 of the second NFC device 514 is rotated from being parallel to the second axis 614 to being parallel to the first axis 612. Additionally, as represented by a second arrow 618, the succession of physical arrangements of the first row 500 proceeds from the second physical arrangement 604 to the third physical arrangement when the second NFC device 514 is rotated 90 degrees counterclockwise (as illustrated in FIG. 6) along the top flat surface 528 of the first NFC device 512. As a consequence of this rotation, the long axis of the antenna 519 of the second NFC device 514 is rotated from being parallel to the first axis 612 back to being parallel to the second axis 614.

In addition to the first row 600, FIG. 6 also includes a second row 608 that shows first, second, and third feature space representations 622, 624, and 626, respectively, which respectively correspond to the first, second, and third physical arrangements 602, 604, and 606, respectively. As with the feature state representations 522, 524, and 526 of FIG. 5, the feature state representations 622, 624, and 626 of FIG. 6 are generated by way of processing performed by the first NFC device 512 in which the first NFC device evaluates the system response to a broadband excitation signal (e.g., a step response) in the frequency domain—namely, the amplitude of the discrete Fourier transform. Again, each of the first, second, and third feature space representations 622, 624, and 626 is a respective graph of spectral amplitude (on the y-axis) versus frequency (on the x-axis) of the RF-off ringing system response signal. It will be noticed from a comparison of FIG. 6 and FIG. 5 that the second feature state representation 624 is identical to the second feature state representation 524. This is appropriate given that the second physical arrangement 604 of FIG. 6 is identical to the second physical arrangement 504 of FIG. 5. Also, because the first and third physical arrangements 602 and 606 of FIG. 6 are identical, the first and third feature space representations 622 and 626 also are identical with one another.

Further, FIG. 6 includes a third row 610 that shows a sequence 630 of first, second, and third system states 632, 634, and 636, respectively. The first, second, and third system states 632, 634, and 636 respectively are based upon and correspond to the first, second, and third feature space representations 622, 624, and 626, respectively, which in turn are respectively indicative of the wireless coupling among the first and second NFC devices 612 and 614 when in the first, second, and third physical arrangements 602, 604, and 606, respectively. In the present example, the first system state 632 is referred to as "State 0" (albeit there is not any relation to "State 0" as shown in FIG. 5). Further, given that the second feature space representation 624 is identical to the second feature space representation 524 (and given that the second physical arrangement 604 is identical to the second physical arrangement 504, the second system state 634 of FIG. 6 is shown to be identical to the second system state 534 of FIG. 5, and is again referred to as a "State 1". Additionally, because the first feature space representation 622 is identical to the third feature space representation 626 (and given that the first and third physical arrangements 602 and 606 are identical), the third system state 636 in this example is the same as the first system state 632, and again is referred to as "State 0".

Further with respect to the example of FIG. 6, it should be appreciated that, during operation, the second NFC device 514 is first placed on the first NFC device 512, with an initial orientation as shown in the first physical arrangement 602. A user may, by rotating the second NFC device 514 first 90 degrees as illustrated by the second physical arrangement 604 and then rotating that device back to the initial position as illustrated by the third physical arrangement 606, interact with the first NFC device 512, the second NFC device 514, or both. Internally, based on the measured feature vectors (as represented by the feature space representations 622, 624, and 626), the orientation of the second NFC device 514 relative to the first NFC device 512 shown in the first and third physical arrangements 602 and 606 is interpreted as the "State 0", and the intermediate orientation of those NFC devices shown in the second physical arrangement 604 is interpreted as the "State 1."

Given such relative movements of the first and second NFC devices 512 and 514 in the example scenario of FIG. 6, it should be appreciated that the system (and particularly the first NFC device 512) may operate as follows to identify/detect both successive states and a corresponding event, consistent with the methods described in regard to FIGS. 3 and 4). In particular, at (or during) each of three successive times (or time periods) when the NFC devices 512 and 514 have the first, second, and third physical arrangements 602, 604, and 606, the system (particularly the first NFC device 512) operates to perform each of the first, second and third steps 302, 304, and 306. That is, the system operates, at each of these three times, to obtain wireless coupling data (e.g., at the step 302), to transform the data to generate the corresponding feature space representation (e.g., at the step 304), and to identify the corresponding system state (e.g., at the step 306).

Further in the present example of FIG. 6, the system (and particularly the first NFC device 512) not only is able to determine system states corresponding to the different physical arrangements 602, 604, and 606 (and associate coupling scenarios), but also is able to detect a corresponding event, in a manner consistent with the fourth step 402 of FIG. 4. That is, FIG. 6 not only shows that the first, second, and third system states 632, 634, and 636 are identified, but also indicates that the first NFC device 512 identifies the sequence 630 of states ("0-1-0"), which constitutes an event, by evaluating the feature space representations 622, 624, and 626. In response to the detection of such an event, the first NFC device 512 additionally may take or perform one or more corresponding actions, consistent with the fifth step 404 of FIG. 4 (and/or the step 218 of FIG. 2).

The application example of FIG. 6 is intended to be representative of any of a variety of operational circumstances that may arise, depending upon the embodiment or characteristics or purposes of the NFC devices. For example, in one embodiment, the first NFC device 512 is an audio player device that selects audio to be played based on the second NFC device 514, which may be an RFID (Radio Frequency Identification) tag. By detecting movement of the second NFC device 514, an additional user-control interface for the system (and for providing user instructions or commands to the first NFC device 512), in addition to the RFID-based functionalities, is established. In an additional example, mobile phone-related functionalities are controlled in response to the detection of an event such as that illustrated by FIG. 6. In such an embodiment, a controlled functionality for a tag may be configured by the user and, if the tag is identified by RFID, the corresponding event detection is enabled and will allow for control as configured.

Notwithstanding the above description, the present disclosure is intended to encompass numerous embodiments including those disclosed herein as well as a variety of alternate embodiments. Indeed, in this regard, the present disclosure encompasses a variety of embodiments of NFC systems and associated devices having any of a variety of systems or subsystems, designs, detectors, and signal processing capabilities. For example, notwithstanding the examples provided in FIGS. 5 and 6, it should be recognized that the present disclosure encompasses any of a variety of other embodiments of systems and methods that are used to identify state(s) or event(s) that may be caused by manipulation of the device's coupling environment (e.g., a deterministic change of a tag load already coupled to the primary NFC device, metal objects that are moved in the NFC device's vicinity, etc.). Further, although the present description envisions NFC systems having devices that are in communication or coupled with one another wirelessly by way of magnetic or inductive coupling, the present disclosure also encompasses embodiments in which wireless communications or coupling are achieved in other manners, such as electromagnetically.

Additionally, although the above discussion describes reading, or taking action, based upon RF-off ringing, the present disclosure also encompasses embodiments in which other signal or signal changes are read, or taking action in response to or based upon such other signals or signal changes, including signals or signal changes involving RF-on ringing or other signaling. Further, the transformation or transformations that are performed or applied to process resonant signal information or captured energy discharge curve information (for example, at the step 304 described above) may include any one or more linear operations or mappings (e.g., a Fourier transform such as a discrete Fourier transform), or any one or more nonlinear operations or mappings (e.g., taking the absolute value, or performing dynamic range compression or employing rectifiers), or a combination of both. Also, although the above description particularly discusses NFC systems, devices and methods, the present disclosure also encompasses Radio Frequency Identification (RFID) systems, devices, and methods.

Also for example, notwithstanding the various applications and use cases described above, the present disclosure also encompasses other alternate embodiments that may involve use case domains that cover NFC devices in any of a variety applications, including applications relating to infrastructure, mobile, computing, contactless payment, transit, ticketing, gaming (e.g., based upon how a card is positioned on a reader), or access (e.g., access security, by restricting or preventing RF spying—or an accessory device statically coupled on reader, identification (ID) allows a return channel/interrupt signal). For example, at least some additional embodiments encompassed herein relate to door access readers that only perform NFC communications upon detection of supported access cards. This allows for the door access readers to achieve enhanced security levels, by preventing communications with RF spying antennas that may be present in proximity of the NFC coupling systems. Further for example, for an NFC system with astatically coupled reader and card device(s), method such as those described herein may be used to achieve out-of-band trigger signals from cards to readers. As an example, a card device may change its resonance frequency by a capacitor value change to signal certain events in the application. The reader device may detect this resonance frequency change as a system state change to trigger associated actions.

Further, in at least some example embodiments encompassed herein, the present disclosure relates to a method of operating a near field communication (NFC) system. The method includes providing a first NFC device including a NFC antenna, and transmitting a radio frequency (RF) signal including a RF carrier signal by way of the NFC antenna. Also, the method includes receiving a first resonant signal after the transmitting has ceased, and processing the first resonant signal to generate a first portion of transformed signal information. Further, the method includes identifying one or both of a first state and a first event based at least in part upon or associated with the first portion of the transformed signal information.

Additionally, in at least some example embodiments encompassed herein, the present disclosure relates to a NFC device. The NFC device includes a subsystem having a control unit, a process and identification unit, and a RF modem. Further, the NFC device also includes a RF matching circuit, and a NFC antenna. The RF modem is configured to capture an energy discharge curve after transmission of a RF signal by the NFC device ceases, by sampling a received signal by way of an analog-to-digital converter (ADC). Also, the process and identification unit is configured to process the captured energy discharge curve to arrive at processed information and, based at least in part upon the processed information, to identify one or both of a first state and a first event.

Further, in at least some example embodiments encompassed herein, the present disclosure relates to a method of operating a near field communication (NFC) system. The method includes providing a first NFC device including a NFC antenna, and transmitting a radio frequency (RF) signal including a RF carrier signal by way of the NFC antenna. The method also includes ceasing the transmitting of the RF signal, receiving a first resonant signal after the transmitting has ceased, and sampling the first resonant signal by way of an analog-to-digital converter (ADC) so as to capture an energy discharge curve. Additionally, the method also includes processing the captured energy discharge curve to generate processed information including one or more feature space representations, identifying one or both of a first state and a first event based at least in part upon or associated with the one or more feature space representations, and taking at least one action in response to the identifying of the one or both of the first state and the first event.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of operating a near field communication (NFC), the method comprising:
   providing a first NFC device including a NFC antenna;
   transmitting a radio frequency (RF) signal including a RF carrier signal by way of the NFC antenna;
   receiving a first resonant signal via the NFC antenna after the transmitting has ceased;
   processing a sequence of resonant signals including the first resonant signal to generate a plurality of states, wherein the plurality of states includes a first state relating to a first antenna arrangement between a combination of the first NFC device and a second NFC device and a non-NFC device relative to the antenna of the first NFC device and a second state relating to a second antenna arrangement between a combination of the first NEC device and the second NFC device relative to the antenna of the first NFC device;
   decoding the plurality of states using a hidden Markov model or a Viterbi algorithm to identify a target sequence representing an event; and
   identifying the event based at least in part upon or associated with the plurality of states.

2. The method of claim 1, wherein the first resonant signal is an RF field off ringing signal.

3. The method of claim 1, further comprising applying a discrete Fourier transform to the first resonant signal.

4. The method of claim 1, wherein the processing the sequence of resonant signals includes evaluating a step response in the frequency domain of the first resonant signal.

5. The method of claim 1, wherein the event relates to one or more of environment sensing, gaming, and NFC physical access.

6. The method of claim 1, wherein the first NFC device is configured in a reader mode of operation.

7. The method of claim 1, wherein the RF signal is sent periodically to determine a coupling state of the NFC device.

8. The method of claim 1, wherein the event concerns a gesture.

9. The method of claim 8, wherein the gesture relates to a movement of the second NFC device relative to the first NFC device.

10. The method of claim 1, wherein the non-NFC device is a metal object.

11. The method of claim 1, wherein the processing of the first resonant signal includes performing a transformation operation on the first resonant signal, wherein the transformation operation that is performed includes one or more of a discrete Fourier transform, dynamic range compression, and rectification.

12. The method of claim 1, further comprising taking an action in response to the identifying of the event.

13. The method of claim 12, wherein the taking of the action includes either ceasing NFC communications by the first NFC device for at least a period of time, or sending a notification.

* * * * *